United States Patent [19]

Tsuji et al.

[11] 4,393,899
[45] Jul. 19, 1983

[54] PLUGGING APPARATUS

[75] Inventors: Tadashi Tsuji; Ryokichi Igarashi, both of Yokohama, Japan

[73] Assignee: Tokyo Shibaura Denki Kabushiki Kaisha, Kanagawa, Japan

[21] Appl. No.: 211,845

[22] Filed: Dec. 1, 1980

[30] Foreign Application Priority Data

Dec. 21, 1979 [JP] Japan .................................. 54-166357

[51] Int. Cl.³ ....................... G21C 17/00; G21C 19/20; F16L 55/10
[52] U.S. Cl. ......................................... 138/89; 138/97; 165/11 A; 165/76; 376/260
[58] Field of Search ....................... 376/203, 204, 260; 165/11 A, 76; 138/89, 97

[56] References Cited

U.S. PATENT DOCUMENTS 4,262,702  4/1981  Streich .................................. 138/89
4,288,290  9/1981  Saima et al. ........................ 376/260

Primary Examiner—Steven L. Stephan
Attorney, Agent, or Firm—Stevens, Davis, Miller & Mosher

[57] ABSTRACT

Apparatus for plugging a plurality of cylindrical holes provided at an inner peripheral wall of a cylindrical container comprises a plurality of plugs to be inserted into the plurality of holes for plugging the same, a support ring assembly having an outer diameter smaller than an inner diameter of the container, and a beam assembly for operating the support ring assembly and the plugs. The support ring assembly supports the plugs on an inner side of the container after the plugs have been inserted into the cylindrical holes, respectively.

6 Claims, 7 Drawing Figures

FIG. I
PRIOR ART
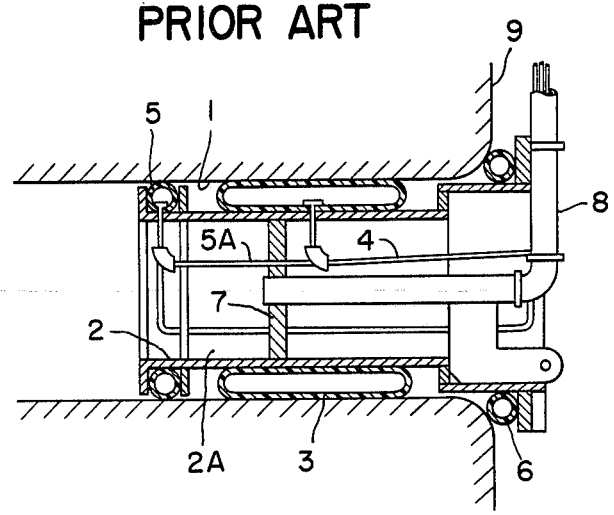
FIG. 6
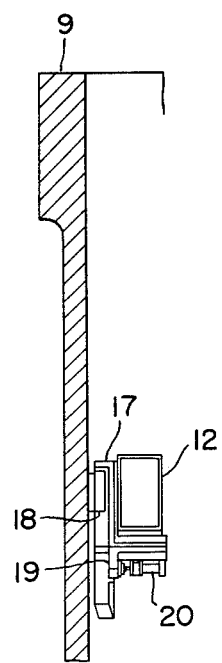
FIG. 7
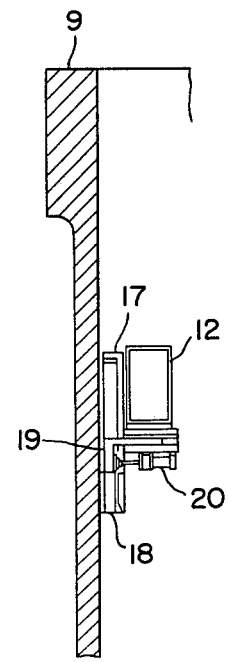

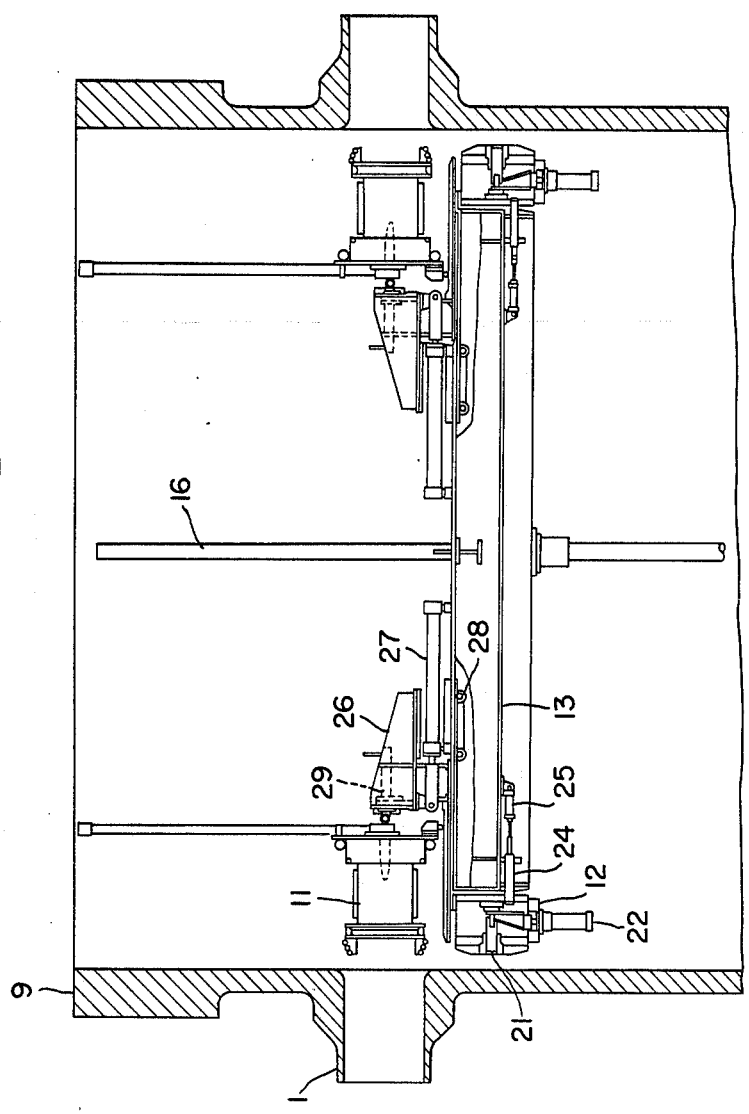

PLUGGING APPARATUS

BACKGROUND OF THE INVENTION

This invention relates to apparatus for plugging cylindrical holes provided at an inner wall of a cylindrical container and, more particularly, apparatus for plugging openings of main steam pipes of a nuclear reactor to easily inspect or maintain safety valves, relief valves, and main steam insulation valves, at the time of shutting-down the reactor.

Generally, at a time of a periodical inspection of a nuclear reactor, the reactor is shut down and the inlet openings of the main steam pipes must be plugged. A reactor pressure vessel is then filled with water until the reactor core is entirely submerged under the water to reduce leakage of radioactive rays from the reactor core. Thereafter, safety valves, relief valves and main steam insulation valves disposed in the steam pipes are overhauled and periodically inspected. A conventional apparatus for plugging the inlet opening of the steam pipe will firstly be described hereinbelow in conjunction with FIG. 1.

FIG. 1, reference numeral 1 designates a main steam pipe provided with an inlet opening. Usually four steam pipes are provided. A cylindrical member 2, which has an outer diameter somewhat smaller than the inner diameter of the steam pipe 1, is inserted into the steam pipe 1 opened into a reactor pressure vessel 9. A cylindrical hollow elastic member 3 is disposed in a space between the outer surface of the support member 2 and the inner surface of the steam pipe 1 so that the inlet opening of the steam pipe 1 is plugged at a time when compressed air is admitted into the hollow elastic member 3 through an air feed pipe 4 connected therewith.

Another cylindrical hollow elastic member 5 is disposed between the outer surface of the support member 2 and the inner surface of the steam pipe 1 at the inner end of the support member 2 and is filled with water fed through a pipe 5A thereby to increase the sealing effect of the plugging apparatus. An O-ring 6 is disposed at the outer end of the support member 2 to further increase the sealing effect of the plugging apparatus due to hydraulic pressure caused by the water filled in the reactor pressure vessel 9.

An annular plate 7 is water-tightly welded to the inside wall of the cylindrical support member 2, and to the annular plate 7 is secured a pipe 8 through which the support member 2 is operated or controlled at the upper portion of the reactor core. In a case where it is desired to remove the plugging apparatus from the steam pipe 1, water is supplied into an inner portion 2A of the support member 2 through the pipe 8 to maintain water pressure balance between the steam pipe 1 and the reactor pressure vessel 9. Between the cylindrical members or rings 5, 3 or 6 are disposed detecting means, not shown, for detecting leakage water, thereby to maintain or inspect the sealing condition therebetween.

According to the conventional plugging apparatus described above, it is necessary to independently insert four plugging apparatus into four steam pipes 1 and it takes much time and labor for attaching or removing the plugging apparatus. Moreover, in a case where an operator checks air-tight capability of the safety valves, relief valves, and main steam insulation valves after the inspection or maintenance thereof, although it is required to apply air pressure between the safety valve and the inserted plugging apparatus, the apparatus will be blown into the reactor pressure vessel by counter pressure of the applied air for the reason that the conventional plugging apparatus has no means for withstanding the counter pressure.

SUMMARY OF THE INVENTION

Accordingly, an object of this invention is to obviate defects of the conventional apparatus described above and to provide plugging apparatus for plugging simultaneously cylindrical holes provided at the inner side wall of a cylindrical container.

Another object of this invention is to provide plugging apparatus comprising a plug support ring which firmly supports the plugs inserted into the cylindrical holes against counter pressure caused by air pressure applied to the inside of the holes.

According to this invention, there is provided apparatus for plugging a plurality of cylindrical holes provided at an inner peripheral wall of a cylindrical container. The apparatus comprises a plurality of plugs to be inserted into the holes for plugging the same, a support ring assembly having an outer diameter smaller than an inner diameter of the container, and a beam assembly for operating the support ring assembly and the plugs. The support ring assembly supports the plugs on an inner side of the container after the plugs have been inserted into the cylindrical holes, respectively.

BRIEF DESCRIPTION OF THE DRAWINGS

In the accompanying drawings:

FIG. 1 is a cross-sectional view illustrating a conventional plugging apparatus inserted into a hole to be plugged;

FIG. 2 shows a vertical cross section of an embodiment of the plugging apparatus according to this invention;

FIGS. 6 and 7 are vertical cross sectional views showing conditions in which a plug support ring is supported by a bracket, respectively, before and after the plugs are supported by the plug support ring.

DESCRIPTION OF THE PREFERRED EMBODIMENT

Figure 3:
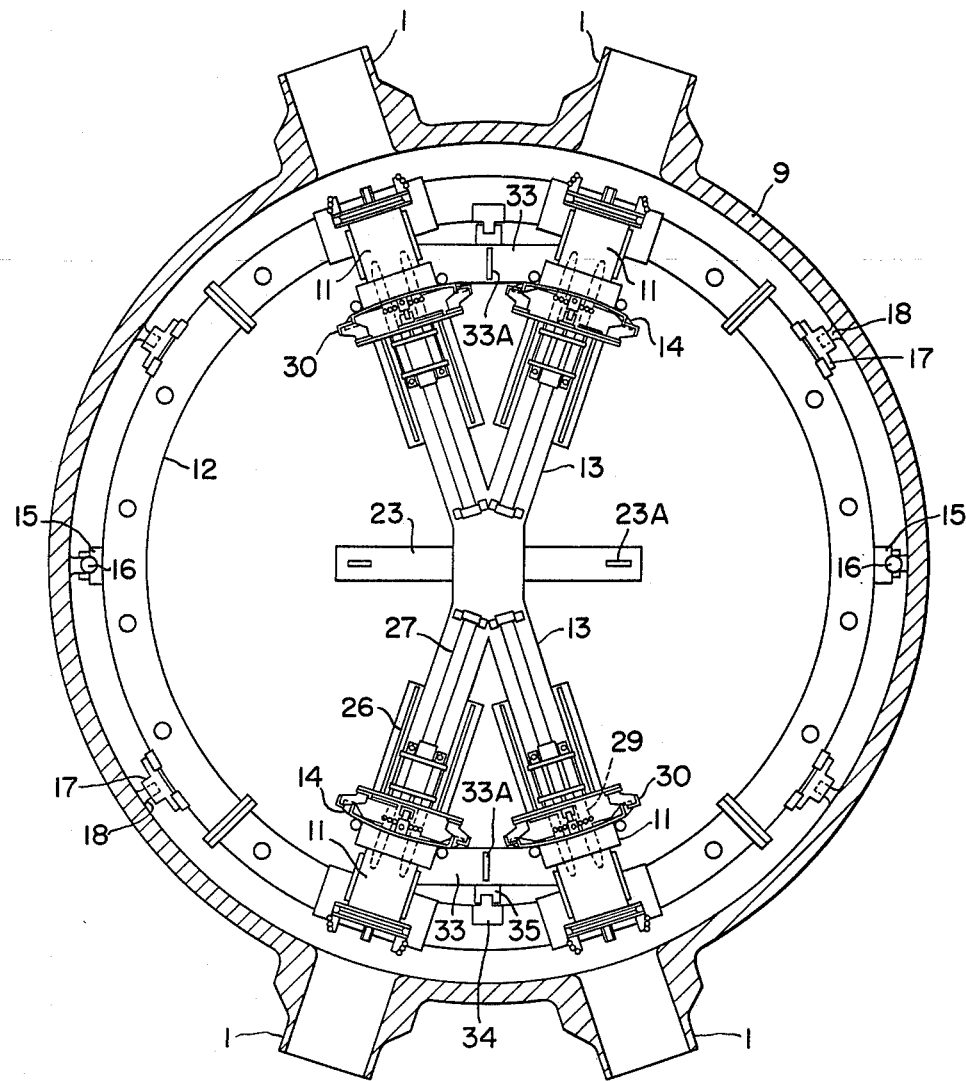
FIGS. 3 and 4 show a horizontal cross sections of the apparatus shown in FIG. 2 before and after plugs are inserted into holes to be plugged, respectively.

As shown in FIGS. 2 and 3, the plugging apparatus of this invention comprises four plugs 11 which water-tightly plug four corresponding main steam pipes 1 opening from a reactor pressure vessel 9, a plug support ring 12 for withstanding counter pressure of compressed air applied to the insie of the steam pipes 1 at the time of inspection or maintenance of safety valves in the steam pipes so as not to push out the plugs from the pipes into the reactor pressure vessel 9, and a beam assembly comprising two beams 13 for simultaneously operating the plugs 11 and the ring 12.

Each plug 11 has substantially the same construction as that of the conventional plugging apparatus shown in FIG. 1 and the plug 11 is provided with a bracket 14 (FIGS. 3 and 4) at its base end for remotely handling the plug 11.

Figure 4:
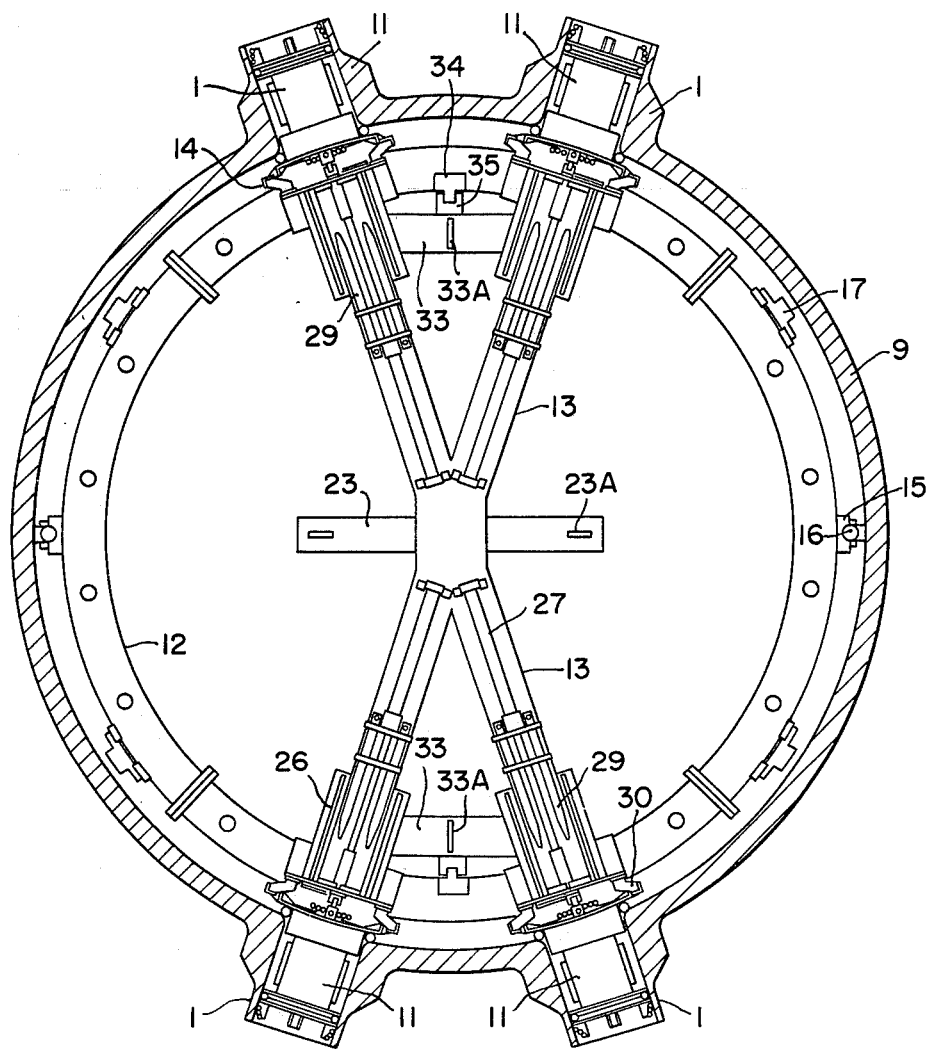
Figure 5:
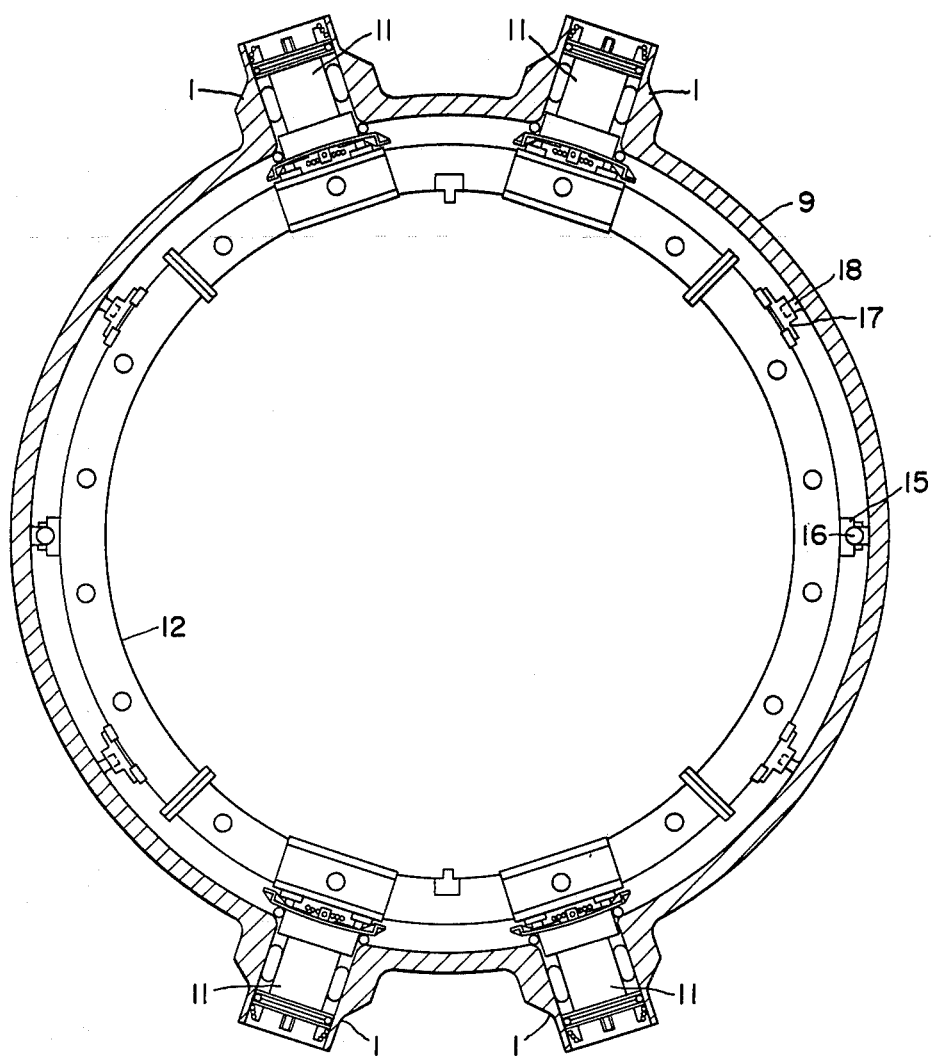
FIG. 5 shows a horizontal cross section of the apparatus shown in FIG. 3 or 4 in a condition wherein a beam assembly is removed.

The plug support ring 12 is concentric with the reactor pressure vessel 9 and has an outer diameter smaller than the inner diameter of the vessel 9. The ring 12 is constructed to be splittable circumferentially into four parts as shown in FIGS. 3 through 5 and movable vertically in the reactor pressure vessel 9 through guides 15 engaging vertical guide rods 16. The guides 15 are mounted on the outer peripheral surface of the ring 12 and the vertical guide rods 16 are mounted on the inner surface of the pressure vessel 9. As shown in FIGS. 6 and 7, support members 17 are secured on the outer surface of the plug support ring 12 to engage with corresponding brackets 18 mounted on the inner wall of the reactor pressure vessel 9 to support in position the plug support ring 12. The other support members 19 are disposed on the lower side of the ring 12 so as to support the plugs 11 at predetermined positions in the inlet openings of the steam pipes 1 after insertion of the plugs so that the plugs 11 are not blown out from the steam pipes into the reactor pressure vessel 9 due to the counter pressure caused by air pressure applied to the inside of the steam pipes 1. Each of the support members 19 can be moved in a radial direction of the ring 12 by the operation of a hydraulic piston-cylinder assembly 20 attached to the lower surface of the ring 12. The inserted plug 11 is supported by the plug support ring 12 by pushing forwardly a rod 21 which is driven by a hydraulic piston cylinder assembly 22 attached to the ring 12 (FIG. 2).

Two beams 13 are crossed and connected together at their central portions to form an X-shaped unitary beam assembly vertically movable in the reactor pressure vessel 9. Support plates 23 and 33 are welded to the beams 13 as shown in FIG. 3 and the plates 23 and 33 are provided with four eyebolts 23A and 33A at predetermined positions as shown in FIG. 3 to which are secured wire ropes operated by a crane disposed at a ceiling of a reactor container vessel, not shown. Thus, the beam assembly is operated by the crane. The beams 13 are detachably connected to the plug support ring 12 through rods 24 (FIG. 2) which are driven by hydraulic piston-cylinder assemblies 25 attached to the lower surfaces of the beams 13. Each support plate 33 is provided with a guide member 35 which engages a corresponding guide member 34 secured to the plug support ring 12 for vertically guiding the beam assembly when it is vertically moved in the reactor pressure vessel 9 after it is separated from the ring 12. The beams 13 and the support plates 23 and 33 are made of shaped steel generally H-shaped in cross section.

Bogies 26 for conveying the plugs 11 along the beams 13 are mounted on the respective front end portions of the beams to be movable thereon by the operation of hydraulic piston-cylinder assemblies 27 attached to the beams 13 and wheels 28 are attached to the bogies 26 for smoothly moving them along the beams 13. Guides 29 are secured to the beams for guiding the plugs 11 in accordance with the movement of the bogies 26 and the plugs 11 are detachably connected to the bogies by engaging the brackets 14 of the plugs with connecting members 30 provided at both sides of the bogies 29.

The hydraulic piston-cylinder assemblies 20, 22, 25 and 27 attached to the plug support ring 12 and the beam assembly 13 are driven by an operating device disposed on a fuel rod exchanging platform of the nuclear reactor, not shown.

The plugging apparatus according to this invention operates as follows:

The plugging apparatus preassembled as an integral body on the floor of the reactor container is lifted by the crane located on the ceiling of the reactor container and moved to a position directly above the reactor pressure vessel 9. The plugging apparatus is then gradually lowered to a position as shown in FIG. 2 or FIG. 3 to be immersed in water filled in the pressure vessel 9. During this operation, the guides 15 of the plug support ring 12 are guided along the guide rods 16 mounted on the inner wall of the reactor pressure vessel 9 so as to direct the plugs 11 on the beams 13 towards the corresponding inlet openings of the steam pipes 1 to be plugged.

By further lowering the plugging apparatus, the support members 17 of the plug support ring 12 are contacted to and firmly engaged with the support brackets 18 so that the positions of the plugs 11 would align with the inlet openings of the steam pipes 1 and the entire weight of the apparatus is then borne by the brackets 18.

Then the hydraulic piston-cylinder assemblies 27 mounted on the beams 13 are operated thereby to simultaneously slide four plugs 11 along the beams and push them into the corresponding inlet openings of the steam pipes 1. After insertion of the plugs 11, the steam pipes 11 are plugged by substantially the same manner, by applying compressed air, described in connection with the conventional plugging apparatus shown in FIG. 1. The plug support ring 12 and the beam assembly are then moved upwardly along the guide rods 16 so that the ring 12 takes a position slightly above the inlet openings of the steam pipes and the hydraulic piston-cylinder assemblies 20 are thereafter operated to push the support members 19 towards the brackets 18. The ring 12 is then lowered together with the beam assembly to rest the support members 19 on the brackets 18. Each of the hydraulic piston-cylinder assemblies 22 operates to push forwardly the rod 21 to firmly engage the plug 11 with the plug support ring 12 thereby preventing the plug from rushing out from the steam pipe due to the counter pressure prevailing in the steam pipe.

When it is desired to separate the beams from the plug support ring, four hydraulic piston-cylinder assemblies 25 are operated to withdraw the rods 24 from the ring 12 and the beams 13 are easily lifted through guide members 34 and 35 on the floor as shown in FIG. 5, and in a case where it is desired to inspect or maintain a jet pump, not shown, located at the lower portion in the pressure vessel to agitate the reactor water, can be separated from the plugs 11 and removed so as not to disturb the inspection of the jet pump.

According to this invention, four plugs are simultaneously handled as one plugging apparatus to plug corresponding four steam pipes, which largely reduces working time for workers. Even when counter pressure caused by air pressure applied in the steam pipe is added to the plug inserted into the steam pipe, the plug does not rush out into a reactor pressure vessel because the plug is firmly supported by a plug support ring.

Moreover, since the plug support ring is constructed to be concentric with the reactor pressure vessel and to have a hollow central portion, the ring does not disturb the operation for changing fuel rods, for example, and since the plug support ring is also constructed to be detachable from a beam assembly, only the ring can be easily removed at a time when a jet pump is to be inspected. In addition, the beam assembly, the plug support ring, and the plugs can be operated and controlled by an operator on a platform disposed at the upper portion of a reactor container vessel, so that irradiation dose for operators can be greatly reduced.

In the foregoing, although a preferred embodiment of this invention is described which is applied to a steam pipe of a reactor pressure vessel, it is of course possible to apply the present invention to plug a cylindrical hole of any other apparatus.

What is claimed is:

1. Apparatus for plugging a plurality of cylindrical holes provided through an inner peripheral wall of a cylindrical container, said apparatus comprising a plurality of plugs to be inserted into said plurality of holes for plugging the same, a supporting ring assembly having an outer diameter smaller than an inner diameter of said container, a beam assembly detachably connected to said ring assembly, means provided on said beam assembly for supporting said plurality of plugs and simultaneously forcing said plugs radially outwardly into said cylindrical holes of said cylindrical container, and means for preventing said plugs from being driven radially inwardly out of said cylindrical holes.

2. Apparatus as set forth in claim 1 wherein said supporting ring assembly is divided into circumferential pieces.

3. Apparatus as set forth in claim 1 which further comprises means for accurately positioning said supporting ring assembly so as to align said plugs supported by said supporting means with said cylindrical holes.

4. Apparatus as set forth in claim 3 wherein said positioning means comprises a plurality of brackets secured on the inner peripheral wall of the container in a circumferentially spaced apart relation, and a corresponding number of supporting pieces secured on the radially outer surface of said ring assembly so that said pieces are engageable with said brackets when said ring assembly is positioned correctly.

5. Apparatus as set forth in claim 1 wherein said means for supporting and forcing said plugs into said holes comprises carriages which are simultaneously driven radially outwardly along said beam assembly by a hydraulic device.

6. Apparatus as set forth in claim 1 wherein said means for preventing said plugs from being driven out of said cylindrical holes comprises means for bringing said ring assembly to a position where a rod projectable from said ring assembly is aligned with each said plug, and a hydraulic device for driving said rod radially outwardly into a tight contact with said plug.

* * * * *